(12) United States Patent
Abadi et al.

(10) Patent No.: US 10,296,311 B2
(45) Date of Patent: May 21, 2019

(54) FINDING UNINITIALIZED VARIABLES OUTSIDE THE LOCAL SCOPE

(71) Applicant: International Business Machines Corporation, Armonk, NY (US)

(72) Inventors: Aharon Abadi, Petach Tikva (IL); Moria Abadi, Petakh-Tikva (IL); Idan Ben-Harrush, Givat Elah (IL); Yishai A Feldman, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 14/951,786

(22) Filed: Nov. 25, 2015

(65) Prior Publication Data
US 2017/0147475 A1 May 25, 2017

(51) Int. Cl.
*G06F 8/41* (2018.01)
(52) U.S. Cl.
CPC .................... *G06F 8/433* (2013.01)
(58) Field of Classification Search
CPC ....................................... G06F 8/433
USPC ....................................... 717/125
See application file for complete search history.

(56) References Cited

U.S. PATENT DOCUMENTS

| | | | |
|---|---|---|---|
| 7,584,452 B1 | 9/2009 | Johnson | |
| 2005/0039165 A1* | 2/2005 | Wolff | G06F 8/423 717/114 |
| 2006/0143527 A1* | 6/2006 | Grey | G06F 11/3672 714/33 |
| 2007/0005633 A1* | 1/2007 | Ball | G06F 11/3608 |
| 2009/0044177 A1* | 2/2009 | Bates | G06F 8/75 717/131 |
| 2012/0311533 A1 | 12/2012 | Fanning et al. | |
| 2013/0055220 A1 | 2/2013 | Murthy | |
| 2013/0174127 A1* | 7/2013 | Chen | G06F 11/3466 717/133 |

(Continued)

FOREIGN PATENT DOCUMENTS

CN 101566968 B 7/2012

OTHER PUBLICATIONS

Abadi et al., "A Parallel On-Demand Algorithm for Computing Interprocedural Dominators", 2014 14th IEEE International Working Conference on Source Code Analysis and Manipulation, Sep. 28-29, 2014, pp. 235-244.

(Continued)

*Primary Examiner* — Li B. Zhen
*Assistant Examiner* — Sen Thong Chen
(74) *Attorney, Agent, or Firm* — Edward J. Wixted, III

(57) ABSTRACT

Embodiments of the present invention provide a method and system for finding uninitialized variables outside the local scope. Initially, a source code of a program is received. The source code may include multiple functions. A checked scope is determined for at least one variable in the source code. The checked scope includes a local scope. Additionally, the local scope is accessed using at least one function call of the functions. Static analysis is run, covering the checked scope for the at least one variable in the source code. At least one inter-procedural dependency is identified to determine whether the at least one variable in the local scope is uninitialized. Responsive to determining that the at least one variable in the local scope is uninitialized the at least one variable is displayed to a user.

16 Claims, 5 Drawing Sheets

(56) References Cited

U.S. PATENT DOCUMENTS

2013/0275954 A1    10/2013  Zhang
2016/0314301 A1*   10/2016  Johns ................... G06F 21/577

OTHER PUBLICATIONS

De Sutter et al., "A Practical Interprocedural Dominance Algorithm", ACM Transactions on Programming Languages and Systems, vol. 29, No. 4, Article 19, Aug. 2007, pp. 1-44.

"Effect of declared and undeclared variables", Stack Overflow, asked Apr. 13, 2013, edited Apr. 15, 2013, 3 pages, <http://stackoverflow.com/questions/15985875/effect-of-declared-and-undeclared-variables>.

"Undefined Vs. Undeclared Variables", Webdeveloper.com, Printed Aug. 20, 2015, 3 pages, <http://www.webdeveloper.com/forum/showthread.php?237126-Undefined-Vs-Undeclared-Variables>.

* cited by examiner

FINDING UNINITIALIZED VARIABLES OUTSIDE THE LOCAL SCOPE

BACKGROUND OF THE INVENTION

The present invention relates generally to the field of computing and, in particular, to finding uninitialized variables which are not local to the scope where they are used to identify the possibility of a programming 'bug'.

In programming, an uninitialized variable is a variable that is declared in a programming code, but lacks a definite known value prior to being used. As such, an uninitialized variable will have some value but not a predictable one. Therefore, uninitialized variables often create programming errors as they are a common source of bugs in software. It is extremely difficult to determine manually if a variable always gets its value prior to use.

SUMMARY

According to one embodiment of the present invention, a method is provided, comprising: receiving, by one or more processors, a source code of a program, wherein the source code of the program comprises a plurality of functions; determining, by one or more processors, a checked scope for at least one variable in the source code, wherein the checked scope comprises a local scope, and wherein the local scope is accessed using at least one function call of the plurality of functions; running, by one or more processors, a static analysis covering the checked scope for the at least one variable in the source code; identifying by one or more processors, at least one inter-procedural dependency, wherein the at least one inter-procedural dependency comprises determining whether the at least one variable in the local scope is uninitialized; and responsive to determining that the at least one variable in the local scope is uninitialized, displaying, by one or more processors, the at least one variable to a user.

Another embodiment of the present invention provides a computer program product for finding uninitialized variables, based on the method described above.

Another embodiment of the present invention provides a computer system for finding uninitialized variables, based on the method described above.

DETAILED DESCRIPTION

Compilers may detect a large variety of programming errors and inform the programmer of any such errors and/or warnings. This provides the programmer an ability to troubleshoot and fix any such found error. Therefore, any error a compiler detects, becomes a non-issue if properly handled and debugged, prior to the program leaving development.

It is important to pinpoint any such programming errors to avoid an issue in running the program, a potential crash, corrupt data and/or incorrect outputs. Yet, there are such errors that a compiler may not detect. Typically, as the size of a program increases, its complexity escalates often obscuring various such errors (commonly referred to as 'bugs'), due to the intricacies of its internal logic and the large number of paths of execution. Such intricacies may cause a bug to only intermittently appear making such bugs difficult to track down and debug. The present invention involves a method to help identify one such issue, uninitialized variables.

Generally, a variable in the context of computer programming is typically a storage location paired with an associated symbolic name (also known as an 'identifier'). The identifier references the stored source code and may be bound to a value during run time. As such, the value of the variable may change during the course of the program execution.

For some programming languages, when a variable is declared, it is often mistakenly assumed that the variable is set to a known value, i.e., '0'. Rather, the variable has no known value. For example, in C++, memory allocated to a variable is not cleared or zeroed upon allocation. There are many cases where a variable scope is not local to the scope where they are used, e.g., fields in classes, static variables, global variables, local variables in JavaScript® may access inside nested functions, JavaScript® closure, etc.

Consequently, such a variable is known as an uninitialized variable, as the variable will have some value, but not a predictable one. As such, an uninitialized variable is a variable that is declared but is not set to a definite, known value prior to being run. Furthermore, the value of an uninitialized variable may change over each iteration a program is run or executed. Therefore, an uninitialized variable in some of the execution paths lacks a set value; its value exists, but its value is unpredictable. Further, a variable's dependency which reaches across procedure boundaries further complicates the determination of whether the variable is initialized.

Figure 1:
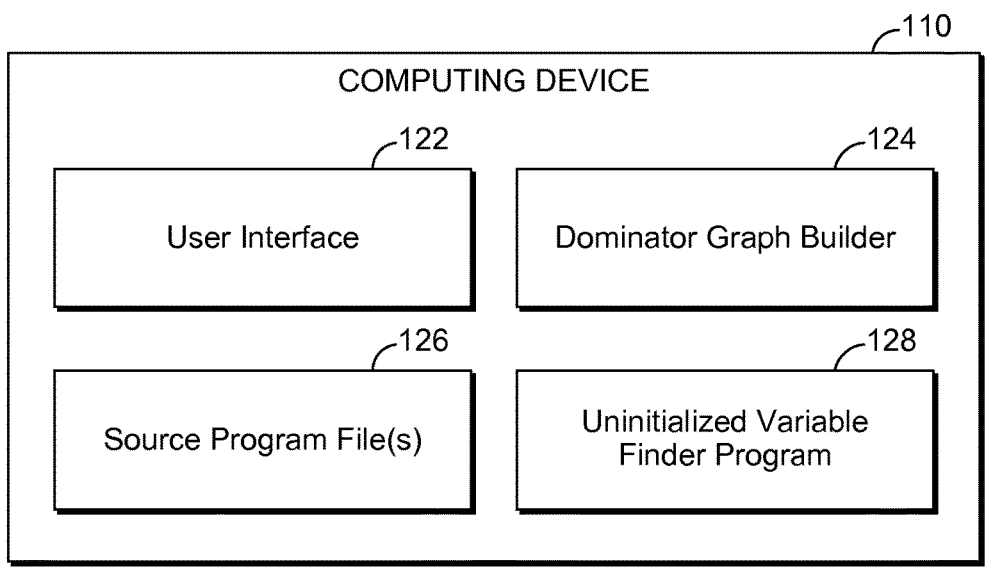
FIG. 1 is a functional block diagram illustrating a computing device, in accordance with an embodiment of the present invention.

The present invention will now be described in detail with reference to the Figures. FIG. 1 is a functional block diagram illustrating a computing device 110, in accordance with an embodiment of the present invention. FIG. 1 provides only an illustration of one embodiment and does not imply any limitations with regard to the environments in which different embodiments may be implemented. Many modifications to the depicted environment may be made by those skilled in the art without departing from the scope of the invention, as recited by the claims.

In various embodiments of the present invention, computing device 110 may be a laptop computer, a tablet computer, a netbook computer, a personal computer (PC) a desktop computer, a personal digital assistant (PDA), a smart phone, or any programmable electronic device capable of executing computer readable program instructions. Computing device 110 may be a server including a management server, a web server or any other electronic device or computing system capable of receiving and sending data.

Computing device 110 includes user interface (UI) 122, dominator graph builder 124, source program files 126 and uninitialized variable finder program (hereafter "UVF program") 128. In various embodiments of the present invention, one or more of dominator graph builder 124, source program files 126 and UVF program 128 may be included. Computing device 110 may include internal and external components, as depicted and described in further detail with respect to FIG. 4.

UI 122 may be, for example, a graphical user interface (GUI) or a web user interface (WUI), and can display text, documents, web browser windows user options, applications interfaces and instructions for operation.

Dominator graph builder 124 determines dominance relationships in the inter-procedural case. Inter-procedural dominance relationships may be portrayed in the form of a graph, where each path represents a dominance relationship. Generally, an inter-procedural dominance graph traces all dominators for a special set of nodes, for which new inter-procedural dominators can be discovered. One skilled in the art, will appreciate that any method for computing a dominator graph may be utilized.

Source program files 126 are one or more computer language files, and may include expressions that perform assignment, arithmetic, and comparison, among other functions. In an embodiment of the present invention, source program files 126 are written in C++ programming language. In an alternative embodiment of the present invention, source program files 126 are written in JavaScript® programming language. In other embodiments of the present invention, source program files 126 may be source program file(s) written in any suitable programming language.

UVF program 128 operates to examine the source program files 126 as well as a dominator graph produced by dominator graph builder 124 to derive uninitialized variables. In an embodiment of the present invention, UVF program 128 supports automated program execution, so that a program may run using a series of scripted commands. In an embodiment, the output from UVF program 128 may be a file, e.g., a log file. In an embodiment, the output from UVF program 128 may be presented on a graphical user interface, such as a display screen. For instance, the output displayed on a graphical user interface may be in a graphical form. Additional outputs may be utilized by those skilled in the art.

Figure 2:
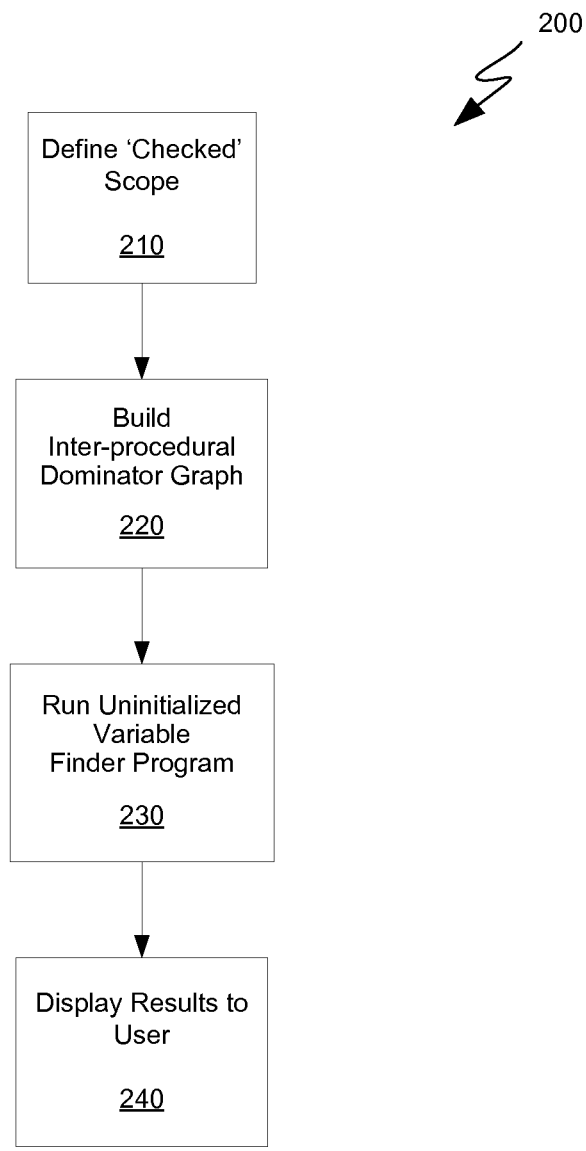
FIG. 2 is a flowchart illustrating operational steps for finding uninitialized variables which are not local to the scope where they are used, in accordance with an embodiment of the present invention.

Reference is now made to FIG. 2. FIG. 2 is a flow chart 200 illustrating operational steps for finding uninitialized variables which are not local to the scope where they are used, in accordance with an embodiment of the present invention.

In step 210, UVF program 128 determines the checked scope for at least one variable. For every variable selected, to determine if the variable is initialized or uninitialized, the scope of the variable must be defined. This is known as a 'checked scope'.

In an embodiment of the present invention, UVF program 128 automatically decides which variables to test in order to determine if the variable is initialized or uninitialized. Alternatively, UVF program 128 may allow a user to select various variables to test, in order to determine if the variable is initialized or uninitialized.

It is noted that the checked scope is source language dependent. Scope is a sub program of the original program, where the variable does not change its behavior. For example, scope can be found automatically, by slicing from the variable use nodes. In another example, scope can be found by automatically defining the scope for variables of the certain kind, to the entire scope, where they can be used.

For instance, C static variable 'checked scope' may be the file scope. It is noted that the 'checked scope' can just be defined by the user.

For example, in JavaScript® the checked scope may be the top checked function. In another example, for Java®, C++ is a class scope, when class fields are accessed. In such a case, there can be a method that uses fields which are not initialized by the constrictor. This list is not intended to be limiting rather it is used for exemplary purposes only.

For example, if a programmer of a large program wants to check if variable 'X' is initialized or not, the programmer must define the scope of the variable. The programmer may statically review the entire program's code for any and all locations that variable 'X' is present. If, for example, variable 'X' is located in two functions, Function H and Function G, then the programmer will locate the entry of the program, MAIN. Therefore, the scope of the variable 'X' contains three functions: Function G, Function H and MAIN.

In step 220, UVF program 128, utilizing dominator graph builder 124, builds inter-procedural dominance relationships, based on a variable(s) checked scope of step 210. The building of a dominator graph may use any algorithm known in the art. Generally, building a dominator graph includes analyzing the source program file(s) 126, (the program code at issue) for dominance relationships between the functions of the software program.

As used herein, the term "dominance", as used in an inter-procedural case considers only paths that preserve the semantics of function calls, which cannot be nested improperly, for example, if a function F calls (directly or indirectly) a function G, then F cannot return before G has returned. Function calls and returns may therefore be paired on a valid inter-procedural path so that they nest properly. In addition, any valid path from the initial node may have unmatched calls, but may not have unmatched returns.

Similarly, the phrase "inter-procedural dominance candidates" means: a node v is an inter-procedural dominance candidate if: v is a function entry with more than one predecessor in the inter-procedural control-flow graph, and v is in the dominance frontier of a resume node or v is in the dominance frontier of another inter-procedural dominance candidate.

Therefore, utilizing dominator graph builder 124, a dominator graph is built covering the checked scope. Those skilled in the art will appreciate the numerous methods in the art which may be used to build the dominator graph for the checked scope, In step 230, UVF program 128, utilizing an additional algorithm, determines the uninitialized variables via the inter-procedural data flow. The algorithm (as further described in FIG. 3A and FIG. 3B) is run on top of the dominator graph.

For example, the dominator graph is used as an input to the algorithm of UVF program 128. Thus, for each node that uses a specific variable, the algorithm backward traverses the edges and checks if the graph contains the specific variables definition. If, for example, the algorithm finds a node that redefines the variables value (i.e., X=Y+1), then it continues with the new variable (i.e., Y) instead of the previous variable (i.e., X).

Therefore, using the inter-procedural data flow information and the inter-procedural dominator information, UVF program 128 checks every use of the selected variable to determine if the selected variable contains an ancestor node which defines the variable. If the selected variable contains an ancestor node, then the variable is defined. Alternatively, if the selected variable does not contain an ancestor node, then the variable is not defined, as it is known as an uninitialized variable. Generally, inter-procedural dependencies are dependencies that exist in source code due to interactions of prior procedures and functions.

The aforementioned process may be repeated for every variable selected, to determine if the variable is initialized or uninitialized.

In step 240, any and all uninitialized variables found are presented to the user. Alternatively, any and all uninitialized variables found are saved in a file for the user.

Figure 3A:
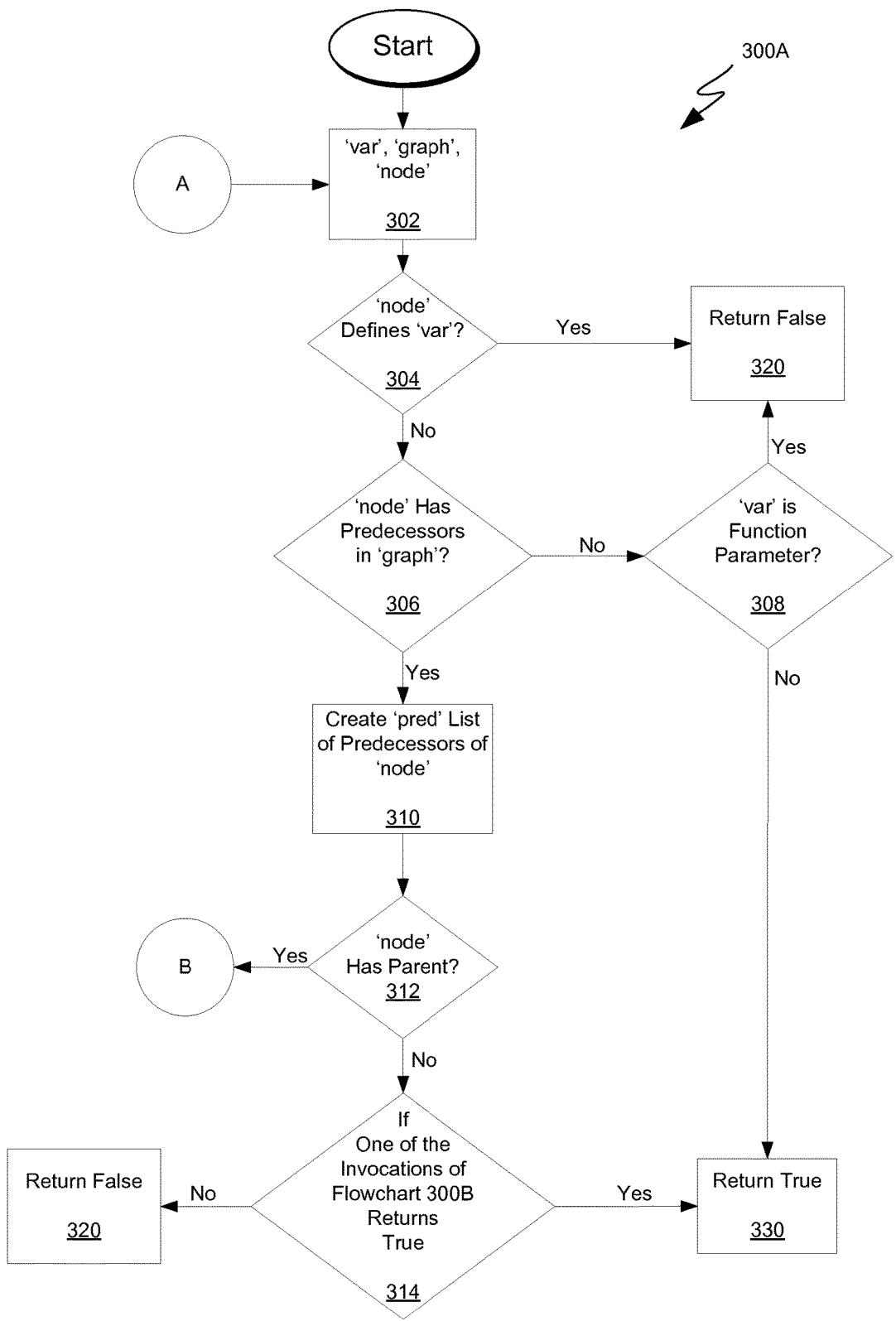
FIGS. 3A-B are flowcharts illustrating detailed exemplary operational steps for finding uninitialized variables, in accordance with an embodiment of the present invention.
Figure 3B:
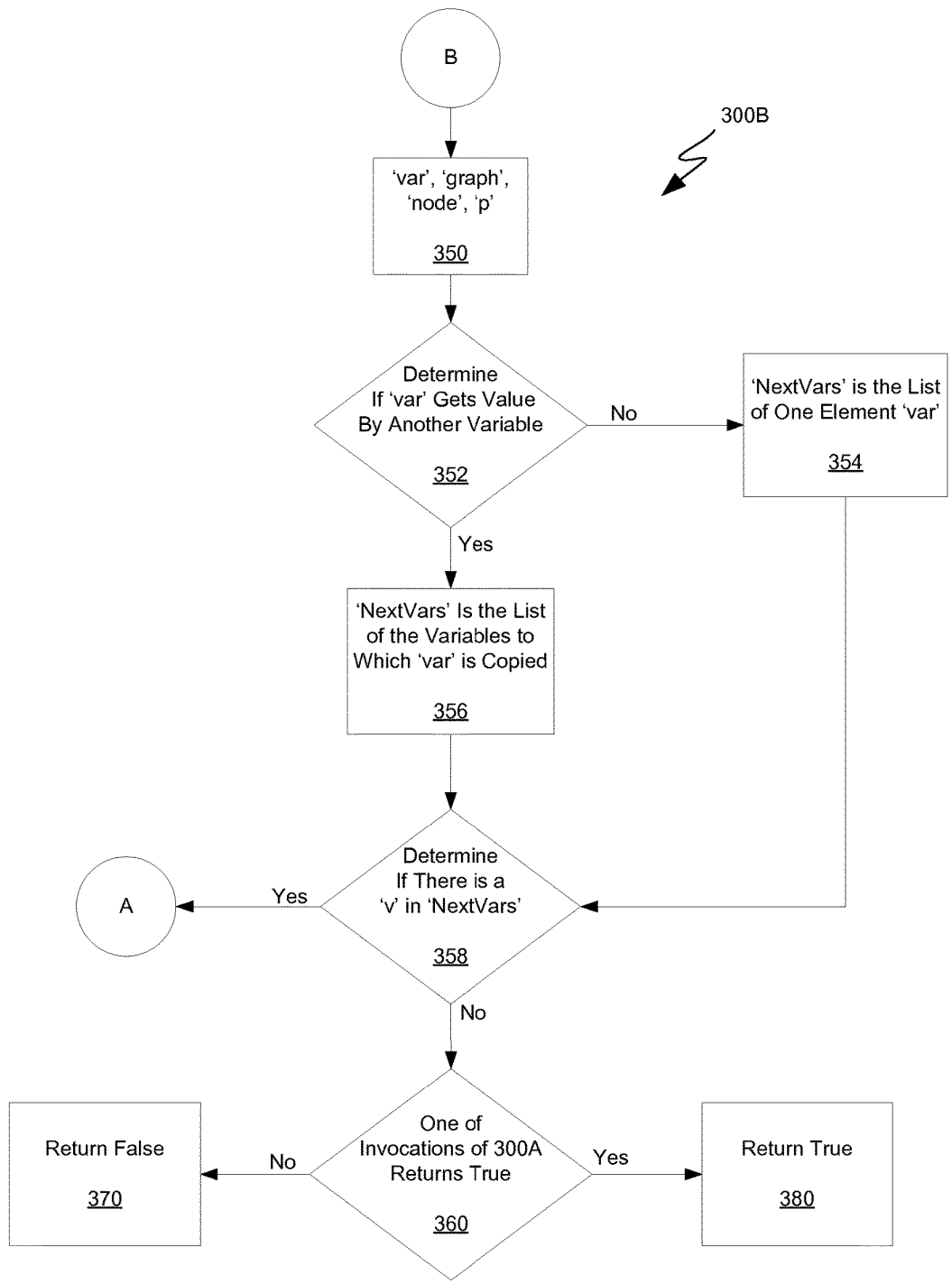

An illustration of the operational steps of UVF program 128 is presented in FIGS. 3A and 3B. FIGS. 3A and 3B are flowcharts illustrating detailed exemplary operational steps for finding uninitialized variables outside the local scope, in accordance with an embodiment of the present invention. Flowchart 300A, as illustrated in FIG. 3A and flowchart 300B, as illustrated in FIG. 3B, depict an exemplary process to find uninitialized variables which are not local to the scope where they are used. Specifically, flowchart 300A and 300B, together, illustrate an algorithm as utilized in step 230 of FIG. 2.

In step 302, UVF program 128, is activated. Exemplary function variables, 'var', 'graph', and 'node', are brought into the program to check for uninitialized variables of source program files 126. In this example, 'var' is the variable being examined; 'graph' is the dominator graph (sometimes also called a function tree); and 'node' is the function being examined.

In step 304, it is determined whether 'var' is defined in 'node'. If the function variable, 'var' is defined in the node, then in step 320, false is returned, thereby ending the operations of UVF program 128 as the node is initialized. However, if the node does not define 'var', then in decision 306 it is determined whether the node has a predecessor found in the 'graph'.

If the node does not have a predecessor, then in step 308 it is determined whether 'var' is a function parameter. If 'var' is a function parameter then false is returned, as the variable is initialized, thereby ending the operations of UVF program 128. Alternatively, if 'var' is not a function parameter then, in step 330, true is returned, also ending the operations of UVF program 128, as 'var' is uninitialized.

Alternatively, if the node does have a predecessor in the graph, then in step 310, 'pred' is created listing all of the predecessors of the 'node'. In decision 312, it is determined whether the 'node' has a parent or predecessor. If the 'node' has at least one predecessor, then for each 'p' (p represents each parent of the node) in 'pred' (the list of predecessors in the 'node') the process goes to flowchart 300B.

If the 'node' does not have a predecessor, i.e., it is the top most parent, then in step 314, it is determined whether the operations of flowchart 300B returned a true at any point. If the operations of flowchart 300B returned a true, then in step 330 a true is returned as 'var' is not defined and uninitialized. Similarly, if flowchart 300B returned a false, then in step 320 a false is returned as 'var' is defined and initialized. It is noted that, that after a return false or true in steps 320 or 330, respectively, the operations may end or return to decision 360, of flowchart 300B depending on the iteration.

Returning to decision 312, if it is determined that the 'node' has a parent or predecessor, then in step 350, of flowchart 300B, exemplary function variables, 'var', 'graph', 'node' and 'p' are brought into the program.

In decision 352, it is determined if the variable, 'var', receives its value from a calculation that involves additional variables. For example, decision 352 determines whether 'var' is copied to other variables in the 'node'. If, for instance, 'var' is given a set value, then in step 354, 'NextVars' is the list of one element 'var'. Alternatively, if the variable, 'var' receives its value from a calculation that involves additional variables then, in step 356, the process continues by analyzing the additional variables. Therefore, in step 356, 'NextVars' is the list of the variables to which 'var' is copied.

In decision 358, it is determined whether there is a 'v' ('v' represents the next variable) in 'NextVars'. For each 'v' in 'NextVars' the process is iterated and returns to step 302, where 'var' is now set to 'v' and 'node' is set to 'p'. The iteration is conducted constantly, moving to predecessors of 'var' in order to determine if the original variable is uninitialized. Stated differently, the process is iterated until a true or a false is returned. If, there is no 'v' in 'NextVars' then in decision 360, it is determined whether the operations of flowchart 300A returned a true at any point. If the operations of flowchart 300A returned a true, then in step 380 a true is returned, as 'var' is not defined and uninitialized. If the operations of flowchart 300A returned a false, then in step 370 a false is returned as 'var' is defined and initialized.

Figure 4:
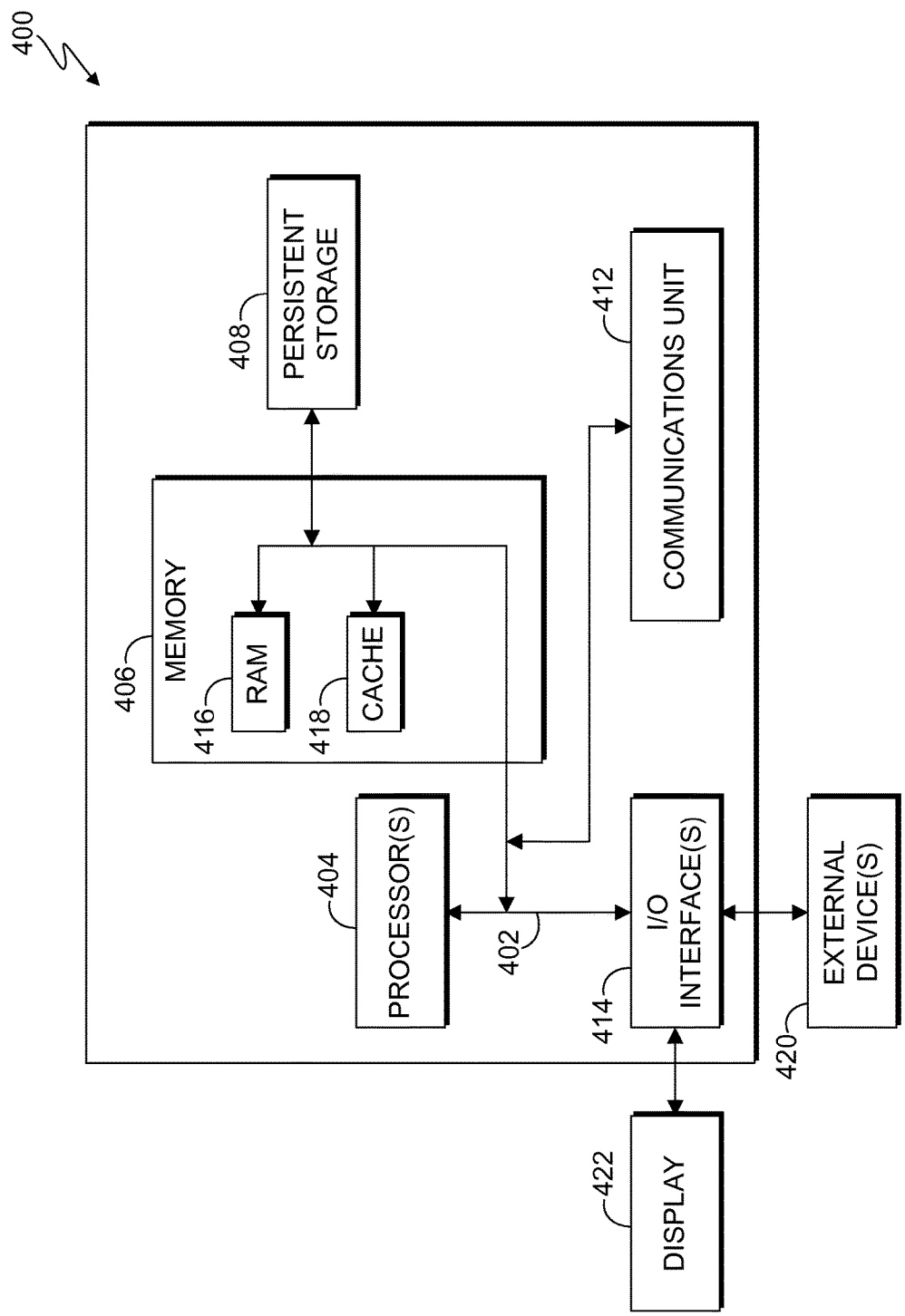
FIG. 4 is a block diagram of internal and external components of a computer device, such as the computing device of FIG. 1, in accordance with an embodiment of the present invention.

FIG. 4 depicts a block diagram of internal and external components of a device 400, in accordance with an illustrative embodiment of the present invention. It should be appreciated that FIG. 4 provides only an illustration of one implementation, and does not imply any limitations with regard to the environments in which different embodiments may be implemented. Many modifications to the depicted environment may be made.

Device 400 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 416 and cache memory 418. In general, memory 406 can include any suitable volatile or non-volatile computer readable storage media. Software is stored in persistent storage 408 for execution and/or access by one or more of the respective processors 404 via one or more memories of memory 406.

Persistent storage 408 may include, for example, a plurality of magnetic hard disk drives. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412 provides for communications with other computer systems or devices via a network. In this exemplary embodiment, communications unit 412 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to through communications unit 412 (e.g., via the Internet, a local area network or other wide area network). From communications unit 412, the software and data can be loaded onto persistent storage 408.

I/O interface(s) 414 allows for input and output of data with other devices that may be connected to device 400. For example, I/O interface 414 may provide a connection to external devices 420, such as a keyboard, keypad, a touch screen, and/or some other suitable input device. External devices 420 can also include portable computer readable storage media such as, for example, thumb drives, portable optical or magnetic disks, and memory cards. Software and data used to practice embodiments of the present invention, can be stored on such portable computer readable storage media and can be loaded onto persistent storage 408 via I/O interface(s) 414. I/O interface(s) 414 also connect to a display 422.

Display 422 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   receiving, by one or more processors, a source code of a program, wherein the source code of the program comprises a plurality of functions, wherein the plurality of functions define one or more variables, wherein each of the one or more variables are either initialized or uninitialized;
   analyzing, by one or more processors, the source code of the program through a compiler;
   identifying, by one or more processors, a plurality of computing bugs from the analyzed source code;
   associating, by one or more processors, each computing bug of a plurality of computing bugs with a respective variable of the analyzed source coded that is uninitialized;
   determining, by one or more processors, a checked scope for at least one variable in the source code, wherein the checked scope comprises a local scope, and wherein the local scope is accessed using at least one function call of the plurality of functions;
   running, by one or more processors, a static analysis covering the checked scope for the at least one variable in the source code wherein running the static analysis further comprises:
   identifying, by one or more processors, at least one inter-procedural dependency by an inter-procedural data flow analysis technique; and
      wherein the at least one inter-procedural dependency comprises determining whether the at least one variable in the local scope is uninitialized based on preserved semantics of the at least one function call;
      responsive to determining that the at least one variable in the local scope is uninitialized, displaying, by one or more processors, the at least one variable to a user, wherein the at least one variable that the local scope is uninitialized is associated with the plurality of computing bugs;
      responsive to displaying the at least one variable that the local scope is uninitialized, identifying, by one or more processors, which computing bug of the plurality of computing bugs from the analyzed source code is a source of potential performance issues; and
      nesting, by one or more processors, the at least one functional call with respective function returns as a plurality of valid inter-procedural dependencies.

2. The method of claim 1, wherein the inter-procedural data flow analysis technique comprises an inter-procedural dominator relation.

3. The method of claim 2, wherein the inter-procedural dominator relation is an inter-procedural dominator graph.

4. The method of claim 1, further comprising:
   discovering, by one or more processors, the at least one variable in the local scope is uninitialized by traversing the at least one inter-procedural dependency on the inter-procedural data flow analysis technique.

5. The method of claim 3, further comprising:
   discovering, by one or more processors, the at least one variable in the local scope is uninitialized by traversing an inter-procedural dominator graph.

6. The method of claim 1, further comprising:
   receiving, by one or more processors, function variables, wherein the function variables received check uninitialized variables of source program files;
   responsive to determining whether the variable is defined in a node, determining, by one or more processors, whether the node has a predecessor found in a graph;
   responsive to determining the node has a predecessor in the graph, generating, by one or more processors, a listing of all predecessors in the node; and
   analyzing, by one or more processors, the function variables, wherein the analysis is conducted constantly in order to determine if the original variable is uninitialized.

7. A computer program product comprising:
   a computer readable storage medium and program instructions stored on the computer readable storage medium, the program instructions comprising:
   program instructions to receive a source code of a program, wherein the source code of the program comprises a plurality of functions, wherein the plurality of functions define one or more variables, wherein each of the one or more variables are either initialized or uninitialized;
   program instructions to analyze the source code of the program through a compiler;
   program instructions to identify a plurality of computing bugs from the analyzed source code;
   program instructions to associate each computing bug of a plurality of computing bugs with a respective variable of the analyzed source coded that is uninitialized;
   program instructions to determine a checked scope for at least one variable in the source code, wherein the checked scope comprises a local scope, and wherein the local scope is accessed using at least one function call of the plurality of functions;
   program instructions to run a static analysis covering the checked scope for the at least one variable in the source code wherein running the static analysis further comprises:

identifying, by one or more processors, at least one inter-procedural dependency by an inter-procedural data flow analysis technique; and
    wherein the at least one inter-procedural dependency comprises determining whether the at least one variable in the local scope is uninitialized based on preserved semantics of the at least one function call;
    responsive to determining that the at least one variable in the local scope is uninitialized, program instructions to display the at least one variable to a user, wherein the at least one variable that the local scope is uninitialized is associated with the plurality of computing bugs;
    responsive to displaying the at least one variable that the local scope is uninitialized, program instructions to identify which computing bug of the plurality of computing bugs from the analyzed source code is a source of potential performance issues; and
    program instructions to nest the at least one functional call with respective function returns as a plurality of valid inter-procedural dependencies.

8. The computer program product of claim 7, wherein the inter-procedural data flow analysis technique comprises an inter-procedural dominator relation.

9. The computer program product of claim 8, wherein the inter-procedural dominator relation is an inter-procedural dominator graph.

10. The computer program product of claim 7, further comprising:
    program instructions to discover the at least one variable in the local scope is uninitialized by traversing the at least one inter-procedural dependency on the inter-procedural data flow analysis technique.

11. The computer program product of claim 9, further comprising:
    program instructions to discover the at least one variable in the local scope is uninitialized by traversing an inter-procedural dominator graph.

12. A computer system comprising:
one or more computer processors;
one or more computer readable storage media;
program instructions stored on the one or more computer readable storage media for execution by at least one of the one or more processors, the program instructions comprising:
program instructions to receive a source code of a program, wherein the source code of the program comprises a plurality of functions, wherein the plurality of functions define one or more variables, wherein each of the one or more variables are either initialized or uninitialized;
program instructions to analyze the source code of the program through a compiler;
program instructions to identify a plurality of computing bugs from the analyzed source code;
program instructions to associate each computing bug of a plurality of computing bugs with a respective variable of the analyzed source coded that is uninitialized;
program instructions to determine a checked scope for at least one variable in the source code, wherein the checked scope comprises a local scope, and wherein the local scope is accessed using at least one function call of the plurality of functions;
program instructions to run a static analysis covering the checked scope for the at least one variable in the source code wherein running the static analysis further comprises:
identifying, by one or more processors, at least one inter-procedural dependency by an inter-procedural data flow analysis technique; and
wherein the at least one inter-procedural dependency comprises determining whether the at least one variable in the local scope is uninitialized based on preserved semantics of the at least one function call;
responsive to determining that the at least one variable in the local scope is uninitialized, program instructions to display the at least one variable to a user, wherein the at least one variable that the local scope is uninitialized is associated with the plurality of computing bugs;
responsive to displaying the at least one variable that the local scope is uninitialized, program instructions to identify which computing bug of the plurality of computing bugs from the analyzed source code is a source of potential performance issues; and
program instructions to nest the at least one functional call with respective function returns as a valid plurality of inter-procedural dependencies.

13. The computer system of claim 12, wherein the inter-procedural data flow analysis technique comprises an inter-procedural dominator relation.

14. The computer system of claim 13, wherein the inter-procedural dominator relation is an inter-procedural dominator graph.

15. The computer system of claim 12, further comprising:
program instructions to discover the at least one variable in the local scope is uninitialized by traversing the at least one inter-procedural dependency on the inter-procedural data flow analysis technique.

16. The computer system of claim 14, further comprising:
program instructions to discover the at least one variable in the local scope is uninitialized by traversing an inter-procedural dominator graph.

* * * * *